United States Patent [19]

Schunk

[11] Patent Number: 5,784,505
[45] Date of Patent: Jul. 21, 1998

[54] OPTICAL SWITCH AND OPTICAL SWITCHING MATRIX HAVING A PLURALITY OF WAVEGUIDES

[75] Inventor: Nikolaus Schunk, Ober-Ramstadt, Germany

[73] Assignee: Robert Bosch GmbH, Stuttgart, Germany

[21] Appl. No.: 545,467

[22] Filed: Oct. 19, 1995

[30] Foreign Application Priority Data

Oct. 19, 1994 [DE] Germany .................. 44 37 325.2

[51] Int. Cl.$^6$ .................. G02B 6/26; G02B 6/42
[52] U.S. Cl. .................. 385/17
[58] Field of Search .................. 385/17, 147, 1; 359/341, 336; 372/6, 31

[56] References Cited

U.S. PATENT DOCUMENTS

| 4,673,270 | 6/1987 | Gordon | 385/30 X |
| 4,798,435 | 1/1989 | Fujiwara et al. | 385/17 |
| 4,946,236 | 8/1990 | Dautartas et al. | 385/17 |
| 5,010,542 | 4/1991 | Pfaff | 385/17 |
| 5,050,954 | 9/1991 | Gardner et al. | 385/33 X |
| 5,255,332 | 10/1993 | Welch et al. | 385/17 |
| 5,440,654 | 8/1995 | Lambert, Jr. | 385/17 |
| 5,446,809 | 8/1995 | Fritz et al. | 385/17 |

FOREIGN PATENT DOCUMENTS

| 053849 | 3/1992 | European Pat. Off. | 385/16 |
| 0 503 849 | 9/1992 | European Pat. Off. | |

*Primary Examiner*—Akm E. Ullah
*Attorney, Agent, or Firm*—Kenyon & Kenyon

[57] ABSTRACT

An optical switch, in which optical input signals are fed together with pumping light to input waveguides. Output waveguides and/or conducting waveguides connected downstream thereof are doped with a dopant which effects amplification of the signal light. A wavelength-selective coupling element is arranged on the output side for the purpose of coupling out the pumping light. This improves signal quality, since the interfering pumping light is virtually no longer present downstream of the wavelength-selective coupling element.

19 Claims, 1 Drawing Sheet

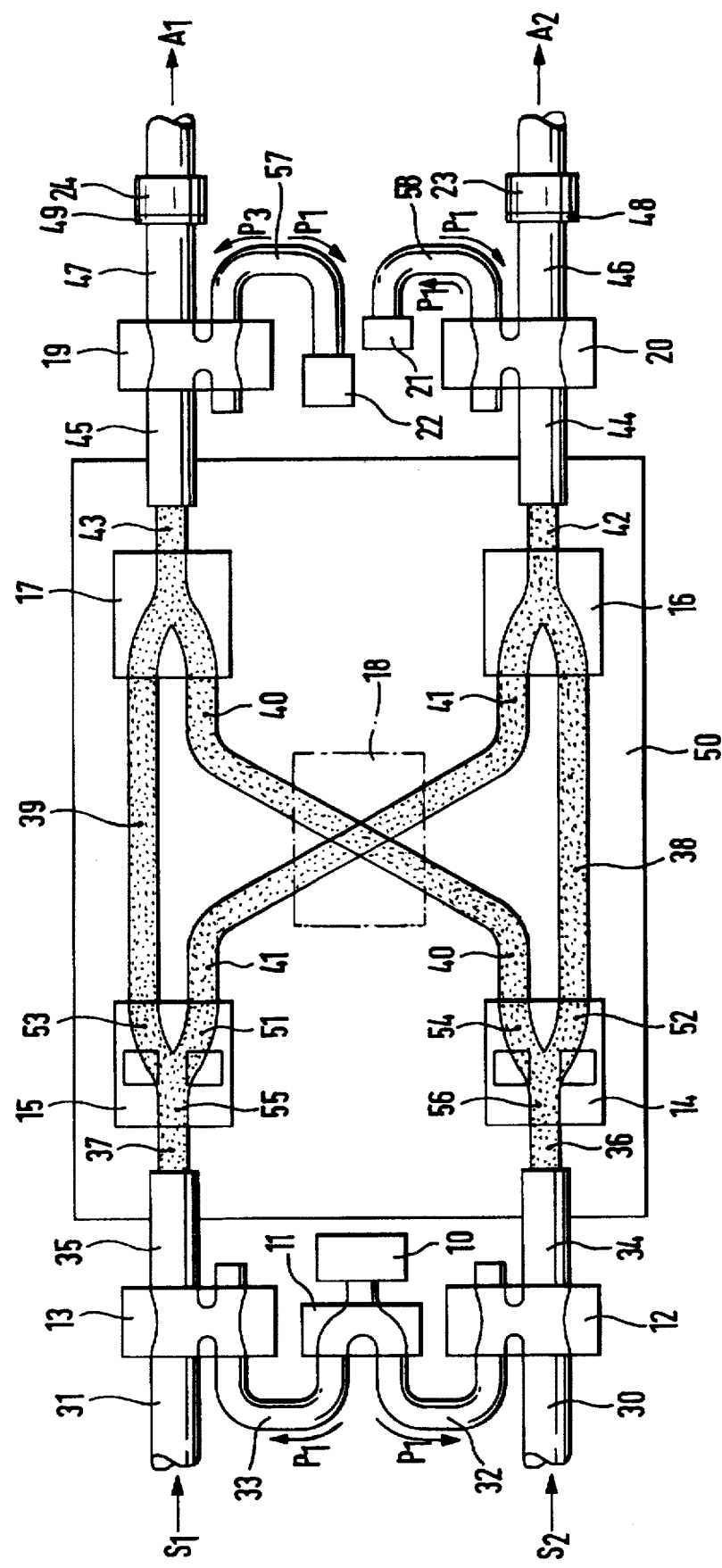

1

OPTICAL SWITCH AND OPTICAL SWITCHING MATRIX HAVING A PLURALITY OF WAVEGUIDES

BACKGROUND INFORMATION

Digital optical switches (DOS) are known which are used to switch over an input signal present on an input waveguide of the digital optical switch to one or two outputs of the DOS. For this purpose, the DOS has a thermal actuator by means of which the thermo-optical effect of a polymer waveguide is utilized to vary the waveguide response inside the switch. Optical fiber amplifiers have been used to date for the purpose of compensating optical losses, in particular in the case of launching optical signals and in the case of coupling out optical signals.

SUMMARY OF THE INVENTION

The optical switch according to the present invention has the advantage that owing to the doping of the output waveguides and/or of conducting waveguides connected downstream thereof, it is possible to achieve a particularly space-saving and cost-effective signal gain for the purpose of compensating optical losses in the optical switch. Furthermore, the crosstalk behavior is improved, since the extinction of the output waveguide which does not conduct the optical input signal is increased.

It is particularly advantageous to provide a wavelength-selective coupling element by means of which the pumping light can be coupled to the optical input signal, since the pumping light can thereby pass into the optical switch in a particularly simple way.

The arrangement of a wavelength-selective coupling element on the output side for the purpose of coupling out the pumping light is used in an advantageous way to improve the signal quality, since the interfering pumping light component is virtually no longer present downstream of the further wavelength-selective coupling element.

The launching or backward pumping light via the further wavelength-selective coupling element is particularly advantageous, since in the case of relatively long output waveguides or conducting waveguides, in particular, the optical attenuation owing to this additional pumping light can be compensated.

The arrangement of a length of waveguide having an optical reflector represents an advantageous measure, since the optical reflector represents a particularly cost-effective component which is used at the same time to couple out the pumping light and to relaunch the reflected component of the coupled-out pumping light as backward pumping light.

If there is connected downstream of one of the output waveguides an optical filter which is opaque to the light produced by amplified spontaneous emission, the advantage is produced that the signal which can be tapped downstream of the optical filter is virtually free from such light which reduces the signal-to-noise ratio.

Connecting an optical isolator upstream of the optical filter is advantageous insofar as filter-induced reflections are reduced in the direction of the doped waveguides, as a result of which the stability response remains guaranteed in the case of the gain which can be achieved by means of doping and pumping light.

The integration of at least the part of the optical switch having the input waveguide and the two output waveguides on a substrate proves to be advantageous because a particularly space-saving arrangement of the optical switch is obtained.

The construction of at least one conducting waveguide in the form of a waveguide channel filled with polymer adhesive is advantageous insofar as the polymer adhesive can also further be used simultaneously for the mechanical fastening of a protective cover for the integrated, optical switch.

If an optical switching matrix having at least two of the optical switches and having at least one signal combiner is formed, the optical switch distinguished by high gain is also available for the field of optical switching matrices for which amplification of the optical signal is particularly important. Since the optical switch is designed in an integrable fashion, an optical switching matrix is thereby fully integrable in a fashion including signal amplification.

The arrangement of two conducting waveguides at a cross-over point at an angle minimizing crosstalk advantageously reduces the intermixing of the mutually crossing signals.

BRIEF DESCRIPTION OF THE DRAWINGS

The figure shows a diagrammatic representation of an optical switching matrix according to the present invention.

DETAILED DESCRIPTION

In the figure, an input light pipe 31 is fed together with a launching fiber 33 to a wavelength-selective coupling element 13. A pumping-light source 10 feeds pumping light $P_1$ to a signal divider 11, which has two outputs. The launching fiber 33 is connected to an output of the signal divider 11. Via a further launching fiber 32, the second output of the signal divider 11 likewise feeds pumping light $P_1$ to a further wavelength-selective coupling element 12, to which a further input light pipe 30 is additionally fed. A length 35 of fiber is arranged at the output of the wavelength-selective coupling element 13. A further length 34 of fiber is likewise connected at the output of the further wavelength selective coupling element 12.

A substrate 50 has, in integrated form, a digital optical switch 15 and a further digital optical switch 14. The digital optical switch 15 has an input waveguide 55 which splits into two output waveguides 51, 53. Likewise, the further digital optical switch 14 has a further input waveguide 56, which splits into two further output waveguides 52, 54. The heating devices of two digital optical switches 14 or 15 are indicated only diagrammatically.

Furthermore, the substrate 50 has two signal combiners 16, 17, which each have two inputs and one output. One input each of the two signal combiners 16, 17 is connected via one conducting waveguide 39, 41 each to one of the output waveguides 51, 53 of the digital optical switch 15. Likewise, each of the two signal combiners 16, 17 is connected to one of the further output waveguides 54, 52 each of the further digital optical switch 14 via further conducting waveguides 38, 40. Two of the conducting waveguides 40, 41 cross over one another at a cross-over point 18. The cross-over point 18 is configured in this case such that the two crossing-over conducting waveguides 40, 41 meet at an angle which keeps the crosstalk to a minimum.

The input waveguide 55 of the digital optical switch 15 is connected to length 35 of fiber via a length 37 of input waveguide. Likewise, the further length 34 of fiber is connected via a further length 36 of input waveguide to the further input waveguide 56 of the further digital optical switch 14.

Arranged at the output of the signal combiner 16 is a length 42 of output waveguide which is connected to a length 44 of fiber. Furthermore, the output of the further signal combiner 17 is connected via a further length 43 of output waveguide to a further length 45 of fiber. The further length 45 of fiber leads to a wavelength-selective coupling element 19 on the output side. Arranged on the output side of the wavelength-selective coupling element 19 is an output fiber 57 on whose end a further pumping-light source 22 is mounted. The length 44 of fiber is connected to a further wavelength-selective coupling element 20 on the output side.

On its side averted from the substrate 50, the further wavelength-selective coupling element 20 on the output side has a length 58 of waveguide which has an optical reflector 21 on its end. Furthermore, there is connected at the output of the further wavelength-selective coupling element 20 on the output side an output light pipe 46 into which an optical filter 23 having an upstream optical isolator 48 is inserted. An output light signal $A_2$ can be extracted from the output light pipe 46 downstream of the optical filter 23.

Likewise connected downstream of the wavelength-selective coupling element 19 on the output side is a further output light pipe 47 into which a further optical filter 24 having an upstream further optical isolator 49 is inserted. Downstream of the further optical filter 24, a further output light signal A1 can be extracted from the further output light pipe 47. An optical input signal $S_1$ is launched into the input light pipe 31. A further optical input signal S2 is launched into the further input light pipe 30.

The optical input signal $S_1$ is mixed with the pumping light $P_1$ by means of the wavelength-selective coupling element 13. The length 35 of fiber thus conducts both the optical input signal $S_1$ and the pumping light $P_1$. Via the length 37 of input waveguide, this light passes to the digital optical switch 15, where it is conducted into one of the two output waveguides 51, 53. Depending on the thermal setting of the digital optical switch 15, the mixture of the optical input signal $S_1$ and pumping light $P_1$ is present either at one output waveguide 51 or at the other output waveguide 53. This light is fed into the signal combiners 16, 17 by means of one of the conducting waveguides 39, 41.

Two light components of the further input signal $S_2$ are cross-coupled with the pumping light $P_1$ in the further wavelength-selective coupling element 12 in a fashion analogous with the optical input signal $S_1$. The light passes via the further length 34 of fiber and the further length 36 of input waveguide to the further digital optical switch 14, where, again corresponding in turn to the switching state, the light is allocated to one of the two further output waveguides 52, 54. Here, as well, the further output waveguides 52, 54 are coupled to the signal combiners 16, 17 via the further conducting waveguides 40, 38.

Two conducting waveguides 40, 41 meet at the cross-over point 18 at a large (obtuse) angle, as a result of which crosstalk is reduced to a minimum. Owing to the arrangement of digital optical switches 14, 15 and signal combiners 16, 17, it is possible by means of appropriate switching over of the digital optical switches 14, 15 for the optical input signals $S_1$, $S_2$ to be connected to an arbitrary combination of the lengths 42, 43 of output waveguide.

The light combined in the signal combiners 16, 17 passes via the lengths 44, 45 of fiber to the wavelength-selective coupling elements 19, 20 on the output side. There, the pumping light $P_1$, is coupled out again. In addition, via the further pumping-light source 22, backward pumping light $P_3$ is launched via the wavelength-selective coupling element 19 in the fashion precisely opposite to the path of the pumping light $P_1$ into the length 45 of fiber. Starting from there, the backward pumping light $P_3$ propagates via the further signal combiner 17 into the conducting waveguides 40, 39. By means of the optical reflector 31 mounted on the end of the length 58 of waveguide, the pumping light $P_1$, which was coupled out from the length 44 of fiber, is reflected and relaunched into the length 44 of fiber on the opposite path. The light, freed by the pumping light $P_1$, which is present downstream of the wavelength-selective coupling elements 19, 20 on the output side passes via the output light pipes 46, 47 to the optical filters 23, 24 via the optical isolators 48, 49.

The signal light of the optical input signals $S_1$, $S_2$ is optically amplified, owing to the doping of the lengths 36, 37 of input waveguide, of the input wave-guides 55, 56, of the output waveguides 51, 52, 53, 54, of the conducting waveguides 39, 40, 41, 38, of the signal combiners 16, 17, and of the lengths 42, 43 of output waveguide. In this process, the dopant absorbs the optical power at the pumping-light wavelength $\lambda_p$, and, on the other hand, in the process amplifies the signal power at the signal light wavelength $\lambda_s$. Owing to the fact that the signal light of the optical input signals $S_1$, $S_2$ is switched over simultaneously with the pumping light $P_1$ by means of the digital optical switches 14, 15, amplification occurs only where the signal light is conducted. Conversely, the doping in the conducting waveguides 39, 40, 41, 38 in which the signal light is not conducted, also produces no amplification, since the pumping light $P_1$ is also not present.

In this case, the doping even effects, by absorption, an additional attenuation of a residual signal light component present. As a result, the crosstalk behavior for the output light signals $A_1$, $A_2$ is improved. Owing to the backward pumping light $P_3$ and the reflected pumping light $P_1$, additional amplification is achieved which is intended, in particular in the case of large switching matrices, to counteract the attenuation of the optical input signals $S_1$, $S_2$ in the case of large optical paths. Since there also occurs in all doped waveguides a spontaneous light emission which is amplified via the dopant (amplified spontaneous emission ASE), the optical filters 23, 24 are used to filter out this light component, which interferes with the signal light. The optical isolators 48, 49 are used to reduce filter-induced reflections of the optical filters 23, 24 in the direction of the coupling matrix. Finally, the output light signals $A_1$, $A_2$, which are relayed or evaluated, can be tapped downstream of the optical filters 23, 24.

Directional couplers can be used as coupling elements 12, 13, 19, 20, and Y-connectors can be employed as signal combiners. Depending on the signal light wave-length $\lambda_s$, rare earths, such as, for example, erbium or praseodymium, or also organic ayes, are suitable. The DOS 14, 15 can either be equipped with one heating device or, for the purpose of faster switching over, with two heating devices (thermal actuators). Both polymers and Ormocers are suitable as material for the conducting waveguides 38, 39, 40, 41. The DOS 14, 15 can also be operated as analog optical switches, or can be replaced by such.

It is further provided that the wavelength-selective coupling elements 12, 13, 19, 20, the optical isolators 48, 49 and the optical filters 23, 24 can be integrated on the substrate 50. A particularly space-saving form of realization of an optical switching matrix is thereby possible. It is further provided to enhance the integration further by integrating the pumping-light sources 10, 22, or even the entire arrangement represented in the figure, on the substrate 50, and coupling to the substrate 50 only the input light pipes 30, 31 and the relaying output light pipes 46, 47 situated downstream of the optical filters 23, 24.

Apart from application in the case of a digital optical switch 14, 15, it is likewise provided to dope a Mach-Zehnder interferometer in a similar way with a dopant and to provide it with a pumping light $P_1$, so that amplification of the signal light also occurs therein.

It is also possible to use further digital optical switches instead of the signal combiners 16, 17, so that other through-connections can be realized.

What is claimed is:

1. An optical switch comprising:
   at least one input waveguide for receiving an optical input signal and pumping light, the optical input signal having a signal light wavelength and the pumping light having a pumping light wavelength; and
   at least two output waveguides connected downstream of the input waveguide for providing respective optical output signals,
   wherein the input waveguide and the output waveguides are doped with at least one dopant such that an entire optical path from the input waveguide to each of the output waveguides is doped, the dopant exhibiting absorption at the pumping light wavelength and stimulated emission at the signal light wavelength.

2. The optical switch according to claim 1, further comprising at least two conducting waveguides connected downstream of the at least two output waveguides, respectively.

3. The optical switch according to claim 2, wherein the conducting waveguides are doped with the dopant.

4. The optical switch according to claim 1, further comprising a wavelength-selective coupling element connected upstream of the input waveguide, the coupling element coupling the pumping light to the optical input signal.

5. The optical switch according to claim 1, further comprising a wavelength-selective coupling element connected downstream of at least one of the output waveguides, the coupling element coupling-out the pumping light.

6. The optical switch according to claim 5, wherein the coupling element transmits backward-pumping light toward the input waveguide.

7. The optical switch according to claim 5, further comprising:
   an optical reflector for reflecting the pumping light; and
   a further waveguide coupling the optical reflector to the coupling element.

8. The optical switch according to claim 1, further comprising an optical filter connected downstream of at least one of the output waveguides, the optical filter being opaque to light produced by amplified spontaneous emission.

9. The optical switch according to claim 8, further comprising an optical isolator connected upstream of the optical filter, the optical isolator reducing filter-induced reflections toward the input waveguide.

10. The optical switch according to claim 1, wherein the input waveguide and the output waveguides are integrated on a substrate.

11. The optical switch according to claim 10, wherein the substrate is a polymer substrate.

12. The optical switch according to claim 10, wherein the substrate is an Ormocer substrate.

13. The optical switch according to claim 2, wherein at least one of the conducting waveguides includes a waveguide channel filled with a liquid, curable polymer adhesive.

14. An optical switching matrix comprising:
   a first input waveguide for receiving a first optical input signal and pumping light, the first optical input signal having a signal light wavelength and the pumping light having a pumping light wavelength;
   a second input waveguide for receiving a second optical input signal and the pumping light, the second optical input signal having the signal light wavelength;
   first, second, third and fourth output waveguides; and
   first and second optical switches, the first optical switch selectively coupling the first input waveguide to the first and second output waveguides, the second optical switch selectively coupling the second input waveguide to the third and fourth output waveguides,
   wherein the first and second input waveguides, the first, second, third and fourth output waveguides, and the first and second optical switches are doped with at least one dopant such that entire optical paths from the first input waveguide to the first and second output waveguides and from the second input waveguide to the third and fourth output waveguides are doped, the dopant exhibiting absorption at the pumping light wavelength and stimulated emission at the signal light wavelength.

15. The optical switching matrix according to claim 14, further comprising a first signal combiner connected to a downstream end of the first and third output waveguides.

16. The optical switching matrix according to claim 15, further comprising a second signal combiner connected to a downstream end of the second and fourth output waveguides.

17. The optical switching matrix according to claim 16, wherein at least one of the first and second signal combiners includes a Y-connector.

18. The optical switching matrix according to claim 16, further comprising first, second, third and fourth conducting waveguides connected to the first, second, third and fourth output waveguides, respectively, the second and third conducting waveguides crossing at a cross-over point at approximately a right angle.

19. The optical switching matrix according to claim 14, further comprising first, second, third and fourth conducting waveguides connected to the first, second, third and fourth output waveguides, respectively, the second and third conducting waveguides crossing at a cross-over point at approximately a right angle.

\* \* \* \* \*